United States Patent
Perdu et al.

(10) Patent No.: US 7,040,820 B2
(45) Date of Patent: May 9, 2006

(54) PRINT LINE SEGMENTATION

(75) Inventors: Patrick G. L. Perdu, Woluwe-St. Pierre (BE); Roberto R. P. Zoldan, Flemalle (BE); Dominique M. E. Didier, Waterloo (BE)

(73) Assignee: Xerox Corporation, Stamford, CT (US)

( * ) Notice: Subject to any disclaimer, the term of this patent is extended or adjusted under 35 U.S.C. 154(b) by 960 days.

(21) Appl. No.: 09/950,073

(22) Filed: Sep. 12, 2001

(65) Prior Publication Data

US 2003/0048472 A1  Mar. 13, 2003

(51) Int. Cl.
   *B41J 11/44*  (2006.01)

(52) U.S. Cl. .......................... 400/76; 70/62; 358/1.15; 358/1.9

(58) Field of Classification Search .................. 400/61, 400/62, 70, 76; 101/224, 248; 358/1.15, 358/1.9

See application file for complete search history.

(56) References Cited

U.S. PATENT DOCUMENTS 5,287,194 A * 2/1994 Lobiondo ................... 358/296
5,559,606 A   9/1996 Webster et al. ............. 358/296
5,579,087 A * 11/1996 Salgado ........................ 399/1
5,873,307 A *  2/1999 Tenfelde et al. ............ 101/248
6,151,131 A * 11/2000 Pepin et al. ................ 358/1.13

FOREIGN PATENT DOCUMENTS

JP    08063312 A  *  3/1996
JP    11194913 A  *  7/1999

\* cited by examiner

*Primary Examiner*—Minh Chau
(74) *Attorney, Agent, or Firm*—Oliff & Berridge, PLC

(57) ABSTRACT

A method of processing data in a printing system comprising a first plurality of printing devices and a second plurality of print-related devices, wherein data is transmitted over a common print line bus is provided. The printing devices and print-related devices are connected to the common print line bus by means of associated print line bus adapters to constitute a printshop environment. The method comprises identifying plural devices from the first plurality of printing devices and the second plurality of print-related devices required for performing a requested print processing, said identified devices constituting a print line segment of the first and second plurality of devices; assigning a segment identifier to the identified devices constituting said print line segment; and configuring the print line bus adapters of those devices that have been assigned said segment identifier in that each device of said segmented devices is able to filter out data that is destined to said respective device from the common print line bus.

33 Claims, 4 Drawing Sheets

PRINT LINE SEGMENTATION

BACKGROUND OF THE INVENTION

1. Field of the Invention

The present invention relates generally to electrophotographic and other document printing devices, and more particularly to a print line comprising devices usable upstream and/or devices usable downstream from an electrophotographic or other printing or document reproduction apparatus for performing various pre-processing operations on a recording medium input into the printing apparatus and/or post-processing operations on the documents output from the printing apparatus.

2. Description of the Related Art

Electrophotographic printing and reproduction devices are well known. Typically, a photoconductive member is charged to a uniform potential and thereafter exposed to a light image of an original document to be reproduced. The exposure discharges the photoconductive member in areas corresponding to the background of the document being reproduced and creates a latent image on the photoconductive member. Alternatively, in a laser-beam printer or the like, a light beam is modulated and used to selectively discharge portions of the photoconductive member in accordance with image information. With either type of apparatus, the latent image on the photoconductive member is visualized by developing the image with a developer powder commonly referred to as "toner." Most systems employ developer which comprises both charged carrier particles and charged toner particles which triboelectrically adhere to the carrier particles. During development of the latent image, the toner particles are attracted from the carrier particles by the charged pattern of image areas on the surface of the photoconductive member to form a visualized toner image on the photoconductive member. This toner image is then transferred to a recording medium such as paper or the like for viewing by an end user. Typically, the toner is fixed to the surface of the paper through the application of heat and pressure.

Following the successful reproduction of one or more documents in this fashion, it is often desirable to perform pre-processing functions on the recording medium and/or one or more of a wide variety of post-processing functions on the printed documents. For example, the recording medium required by a continuous feed printing apparatus may be a band/roll of paper. Upstream of the continuous feed printer a respective pre-processor such as an unwinder or the like is necessary to feed the paper from the band/roll into the continuous feed printer. The continuous feed printer prints an image or the like on the paper and a respective post-processor such as a rewinder is necessary downstream the continuous feed printer to rewind the band/roll. Other post-processors like burster/trimmer/stacker, cutter, inserter, post-printers, label stickers or the like may also be applied. For example, certain applications require the selective addition of color or other enhancements to the printed documents using ink jet annotation or the like, application of magnetic ink character recognition media, job/document serial number and account auditing, insertion of pages into the printed documents, brail embossing, perforation, slitting, envelope stuffing, and postage metering.

In the prior art, a print product capable of performing a requested print processing is formed by combining plural modules, i.e. dedicated physically modular pre- and/or post-processing devices and a printing apparatus, in a single standalone printing product. Such a physically modular product is not easily reconfigured and the constituting components can typically not be used on other products without extensive revision of the control software.

U.S. Pat. No. 5,559,606, assigned to the same assignee as the present invention, describes a standalone printing product comprising a controller and a plurality of modules, which may be of different vendors, in an arbitrary configuration. Each of the modules includes an associated processor storing data related to operational constraints of the associated modules and a bus interconnects the processors to the controller for directing the operation of the modules. The controller is adapted to operate independent of a particular configuration of the plurality of modules by receiving from each of the processors the data related to the operational constraints of each associated module and interrogating each of the processors to determine the geometrical relationship of the interconnection of the modules. The controller then responds to the data related to the operational constraints of each of the processors and to the geometrical relationship of the interconnection of the modules to dynamically configure the image processing apparatus to operate in accordance with the operational constraints of each of the processors and to the geometrical relationship of the interconnection of the modules.

Once such a standalone printing product comprising plural modules has been defined, creating print engines in accordance with said printing product, for instane for a particular customer need, is significantly simplified. In the ideal case, one simply selects which modules and how many of each are required, and ships them to the customer to be assembled on site.

In a printshop environment, plural pre- and post-processing devices and appropriate printing apparatuses and/or standalone printing products are combined to constitute a print line for performing a specific print processing dependent on the printshop requirements. The pre- and post-processing functions can be carried out off-line with one or more dedicated pre- and/or post-processing devices. Of course, the modules are specially designed to perform certain specific pre- or post-processing functions, so that a specific print line is only adapted to perform a specific print processing. The performance of other required print processing necessitates the replacement of some or all of these modules in their entirety.

Accordingly, a need has been recognized for a re-configurable print line allowing for an easy and efficient configuring of thereof with respect to a requested print processing without inducing substantial hardware or software modifications. The subject invention is deemed to meet the foregoing needs and others, and to provide a method of processing data in a printing system comprising a plurality of printing and print-related devices, wherein data is transmitted over a common print line bus, the printing devices and print-related devices being connected to the common print line bus by means of associated print line bus adapters to constitute a printshop environment, the method enabling for easily configuring and re-configuring the plurality of printing and print-related devices in accordance with a requested print processing.

SUMMARY OF THE INVENTION

One disclosed feature of the embodiments is a method comprising identifying plural devices from a plurality of electrical devices required for performing a requested data processing, said identified devices constituting a segment of the plurality of electrical devices; assigning a segment identifier to the identified devices constituting said segment; and configuring adapters associated with those electrical devices that have been assigned said segment identifier in that each device of said segmented devices is able to filter out data that is destined to said respective device from a common data bus.

Another disclosed feature of the embodiments is a method of processing data in a printing system comprising a first plurality of printing devices and a second plurality of print-related devices, wherein data is transmitted over a common print line bus, the printing devices and print-related devices being connected to the common print line bus by means of associated print line bus adapters to constitute a printshop environment, the method comprising identifying plural devices from the first plurality of printing devices and the second plurality of print-related devices required for performing a requested print processing, said identified devices constituting a print line segment of the first and second plurality of devices; assigning a segment identifier to the identified devices constituting said print line segment; and configuring the print line bus adapters of those devices that have been assigned said segment identifier in that each device of said segmented devices is able to filter out data that is destined to said respective device from the common print line bus.

Another disclosed feature of the embodiments is a method of processing data in a data processing system comprising a plurality of electrical devices, wherein data is transmitted over a common data bus, the electrical devices being connected to the common data bus by means of associated adapters, the method comprising identifying plural devices from the plurality of electrical devices required for performing a requested data processing, said identified devices constituting a segment of the plurality of electrical devices; assigning a segment identifier to the identified devices constituting said segment; and configuring the adapters of those electrical devices that have been assigned said segment identifier in that each device of said segmented devices is able to filter out data that is destined to said respective device from the common data bus.

Another disclosed feature of the embodiments is a print line comprising a first plurality of printing devices and a second plurality of print-related devices, wherein data is transmitted over a common print line bus, the printing devices and print-related devices being connected to the common print line bus by means of associated print line bus adapters to constitute a printshop environment, and a print line management unit for establishing segments of the print line, the print line management unit comprising identifying means for identifying plural devices from the first plurality of printing devices and the second plurality of print-related devices required for performing a requested print processing, said identified devices constituting a print line segment of the first and second plurality of devices; assigning means for assigning a segment identifier to the identified devices constituting said print line segment; and configuring means for configuring the print line bus adapters of those devices that have been assigned said segment identifier in that each device of said segmented devices is able to filter out data that is destined to said respective device from the common print line bus.

BRIEF DESCRIPTION OF THE DRAWINGS

The accompanying drawings are incorporated into and form a part of the specification to illustrate embodiments of the present invention. The drawings, together with the description, serve to explain the principles of the invention. The drawings are only for the purpose of illustrating alternative examples of how the invention can be made and used and are not to be construed as limiting the invention to only the illustrated and described embodiments. Further features and advantages will become apparent from the following description of the invention as illustrated in the accompanying drawings, wherein.

DETAILED DESCRIPTION OF THE EMBODIMENTS

Figure 1:
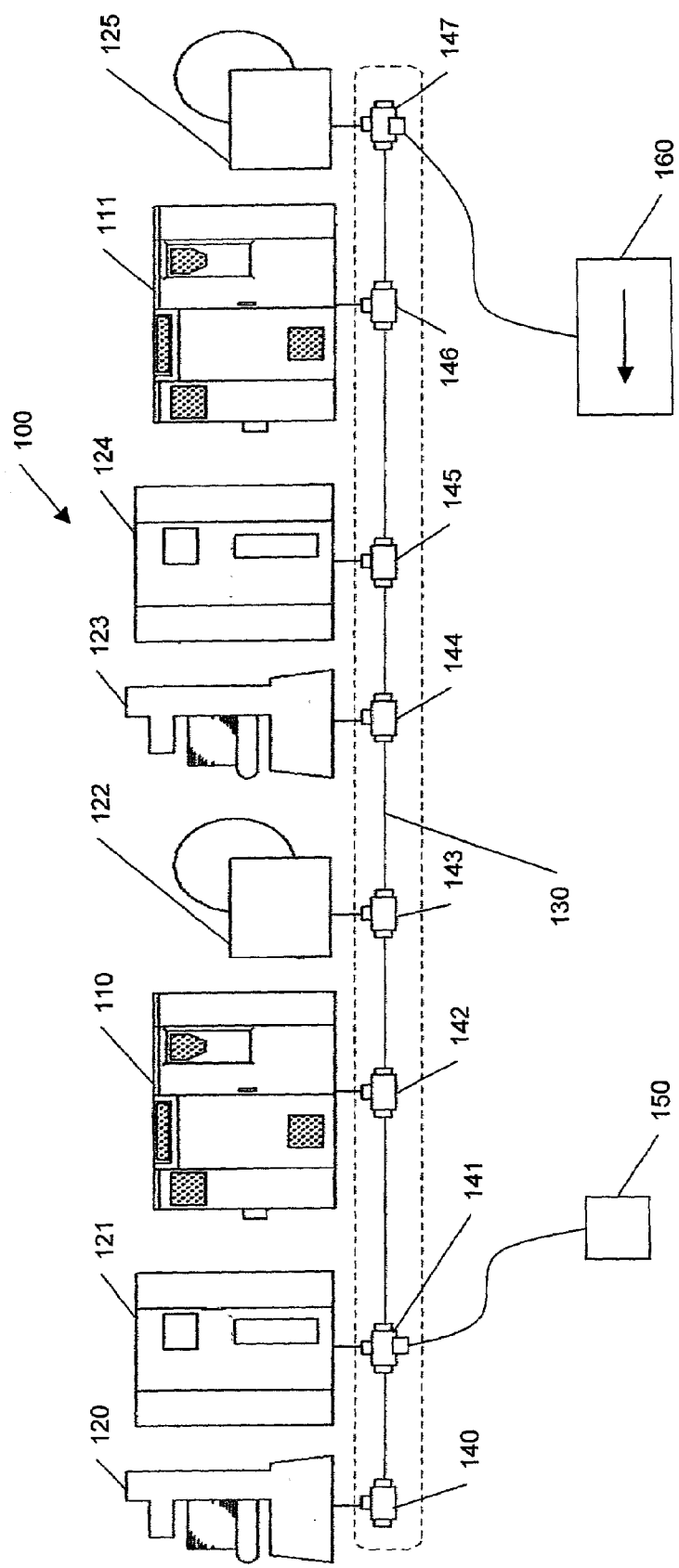
FIG. 1 is a front elevational view of a print line according to the invention.

Referring now to the drawings wherein FIG. 1 illustrates a print line 100 according to the present invention, comprising a plurality of devices 110, 111 and 120–125 representing printing devices 110, 111 and print-related devices 120–125, which are connected to a common print line bus 130 by means of associated print line bus adapters 140–147. The print line bus adapters 140–147 are powered via the print line bus 130 by a power supply 150. At least one of the printing devices 110, 111 provides for a graphical user interface that implements a print line management layer. A corresponding print line management unit 160 is, for instance, connected via a RS232 cable to any one of the print line bus adapters 140–147. Communication between the print line management unit 160 and the corresponding print line bus adapter 140–147 is, for instance, performed via a type-2 protocol.

In the following description, the terms "printing device" and "paper master" are synonymously used to designate the devices 110 and 111. The terms "pre-processor" and "preprocessor paper slave" are synonymously used to designate the devices 122 and 125. The terms "post-processor" and "post-processor paper slave" are synonymously used to designate the devices 120, 121, 123 and 124. The term "paper slave" is further used to designate any of the devices 120–125. The terms "print line bus adapter" and "adapter" are synonymously used to designate the devices 140–147.

Definitions and Requirements

Each printing device 110, 111 preferably represents a paper master, i.e. a device that has the capability to direct/control the paper movement along a paper path in the print line 100. If plural paper masters are comprised in a single paper path, they need to be synchronized.

Paper masters are, for instance, printers like a continuous feed (CF) printer. A CF printer, as opposed to cut sheet printers, prints on a band/roll of paper and not on discrete separate sheets. The band/roll is separated into single sheets once printing is complete. Typically, a CF printer drives the paper using sprocket holes on the edges, but so-called pinless friction drive or any other solution is possible as well.

Each print-related device 120–125 preferably represents a paper slave, i.e. a device that does not have the capability to decide by itself to pull/move the paper. It may be able to actually drive the paper but it will do so only when a paper master actually moves paper. It may also request the paper movement, but will wait for a paper master of the segment to actually move paper. Typically, a paper slave will regulate its speed on the pace set by at least one paper master by regulating/synching on a paper loop or by receiving a paper advance clock and timing to it.

A paper slave is, for instance, a pre-/post-processor. Pre-/post-processors are devices that feed paper into (PRE) and accept printed output from (POST) a printer. Pre- and post-processors are preferably adapted to the printing requirements. For example in a continuous feed printing environment a typical high-speed paper path is achieved using a roll un-winder as pre-processor and a re-winder, burster/trimmer/sticker (BTS), a cutter, an inserter (in envelopes), post-printers, labels stickers and so on as post-processors.

The print line bus 130 is used to interface different paper masters and paper slaves in the print line 100. Each paper master 110, 111 and each paper slave 120–125 is associated with a microprocessor controlled print line bus adapter 140–147 used to connect the corresponding paper master or slave to the print line bus 130. Each print line bus adapter 140–147 interfaces to its associated device using the device's own/native signals. The adapters 140–147 are connected to the print line bus 130 for power and communication, whereby the communication is based on an automotive serial protocol known for its real-time and intrinsic security features. The print line bus 130 comprises the totality of the networked print line bus adapters 140–147, each possibly attached to a specific paper master or paper slave.

The print line bus adapters 140–147 are used to interface the associated paper masters and slaves to the print line bus 130 and serve to establish a segmentation of the print line 100. The print line bus adapters 140–147 serve for managing established segments by filtering data traffic transmitted over the print line bus 130 such, that associated devices only receive messages sent thereto.

The paper masters 110, 111 comprised in the print line 100 according to FIG. 1 may be electrophotographic printing devices or any other suitable printing or document reproduction devices such as ink-jet printers or the like. The paper masters each include a document output region or assembly which outputs original printed documents or reproduction of printed documents, which are printed on a band/roll of paper in the case that the paper master 110, 111 represents a CF printer.

Any pre-processor paper slave 121, 125 in the print line 100 comprises at least an output region for feeding paper into a subsequent paper master.

Each post-processor paper slave 120, 121, 123, 124 includes an input interface which receives paper from the output region of the preceding paper master 110, 111 or the preceding post-processor paper slave 121, 124 and further includes a paper output region for outputting processed paper. The processed paper may represent finished or partially finished documents provided to an end-user or, in the case that the post-processor paper slave interfaces with another post-processor paper slave or any other paper master, serves to forward the paper to said further post-processor paper slave.

The input interface of any paper master or slave comprises a mechanical interface such as a vacuum sheet transport surface, roller transport assembly, or the like for paper transport in a predetermined print line direction.

The print line bus 130 serves for the transmission of control signals between the paper masters and slaves.

According to an embodiment of the present invention, the print line shown in FIG. 1 may be segmented. Segmentation allows for the definition of one or several independent paper paths using the devices 110, 111, 120–125 comprised in the print line 100. Basically, segmentation allows logical groupings of physical devices such that an independent paper path exists. An independent paper path constitutes a segment of the print line and represents a finite and ordered set of print line 100 devices that includes at least one paper master 110, 111. Accordingly, there can be as many coexisting segments in one print line as there are paper masters within said print line. As a paper master representing a cut sheet printer can usually print from a box of paper to its internal stacker, a segment needs not to comprise a paper slave.

Segments currently in use are designated as operational segments. In order to avoid interference between such operational segments and segments that are defined but not currently in use, or un-segmented devices comprised in the print line 100, which have not been allocated to any segment, the devices allocated to an operational segment must only receive messages directed to said devices. Furthermore, in order not to disturb the processing of an operational segment, a device allocated to said segment must be blocked from being allocated to another segment. Each paper master may be connected to a processing unit adapted for issuing print jobs representing data to be printed. If an operational segment comprises more than one paper master, the data to be printed may be issued from any of the paper masters.

According to the present invention, at least one of the paper masters comprises a display unit for providing a graphical user interface (GUI). This paper master preferably integrates a print line management unit 160 that constitutes a software layer for collecting the print line segment handling information and allowing for print line segment level operation by a user through the GUI. An exemplary GUI will be explained below in more detail with reference to FIG. 3.

The print line management unit 160 is responsible for the selection of the segment to be used and the communication of corresponding parameters to the print line bus 130. In particular, the print line management unit 160 is adapted for device selection and print line setup and serves for print line status monitoring and control. Thereby, the print line management unit 160 performs allocation of required devices from the print line, paper threading and unloading, jam recovery, job completion tracking, device alignment and calibration. Alignment is the setup required so that, for instance, two printers process the same paper output and data on the same physical sheet.

Furthermore, the print line management unit 160 communicates with all print line management units associated with other paper masters comprised in the same segment and designates the totality of networked print line management unit layers of devices that are part of the same segment.

Finally, the print line management unit 160 is adapted for releasing the segments of the print line management unit equipped devices, terminating the network links with them and unlocking the segment at the print line bus level so that the print line bus 130 releases all devices comprised in the segment.

Exemplary Print Line Segmentations

Figure 2A:
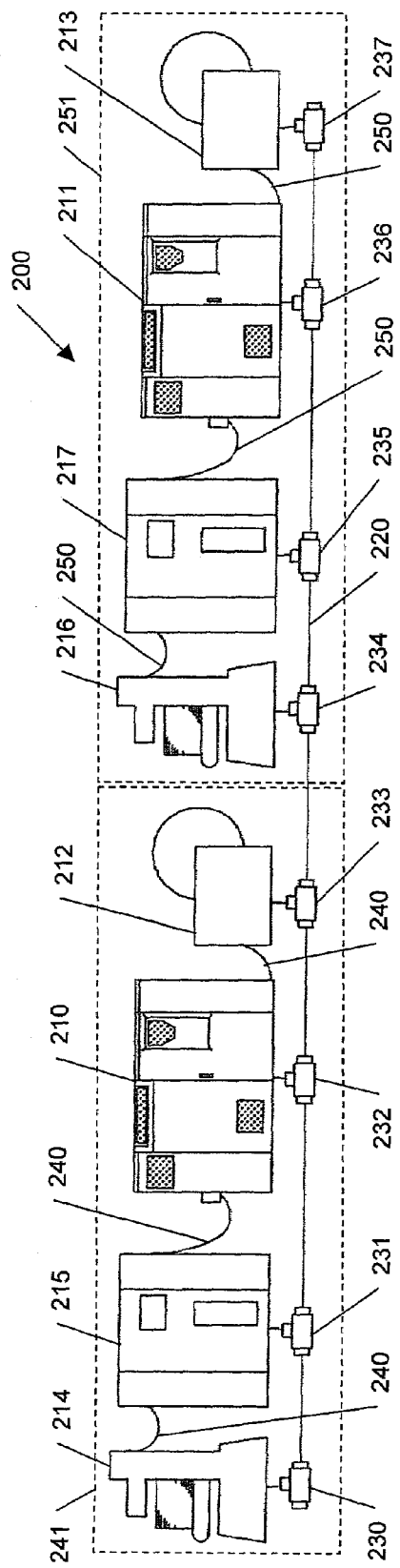
FIGS. 2A and 2B are front elevational views of print line segmentations according to the invention.

FIG. 2A shows a print line 200 comprising two paper masters, two pre-processor paper slaves 212, 213 and four post-processor paper slaves 214–217, the paper masters and slaves being connected to a print line bus 220 by means of print line bus adapters 230–237 associated with each of the paper masters and slaves. The print line 200 has exemplarily been segmented into two segments 241, 251 for dual simplex usage.

As can be seen from FIG. 2A, the two paper masters 210, 211 print on different paper; each paper master being comprised in a separate paper path 240, 250. The first paper path 240 comprises pre-processor 212, paper master 210 and post-processors 214, 215 and the second paper path 250 comprises pre-processor 213, paper master 211 and post-processors 216, 217. By way of example, the illustrated paper masters 270, 271 represent CF printers, the illustrated pre-processor paper slaves 212, 213 represent un-winders that feed paper into the paper masters and the illustrated post-processor paper slaves 214, 215 and 216, 217 represent a cutter and a stacker, respectively.

Figure 2B:
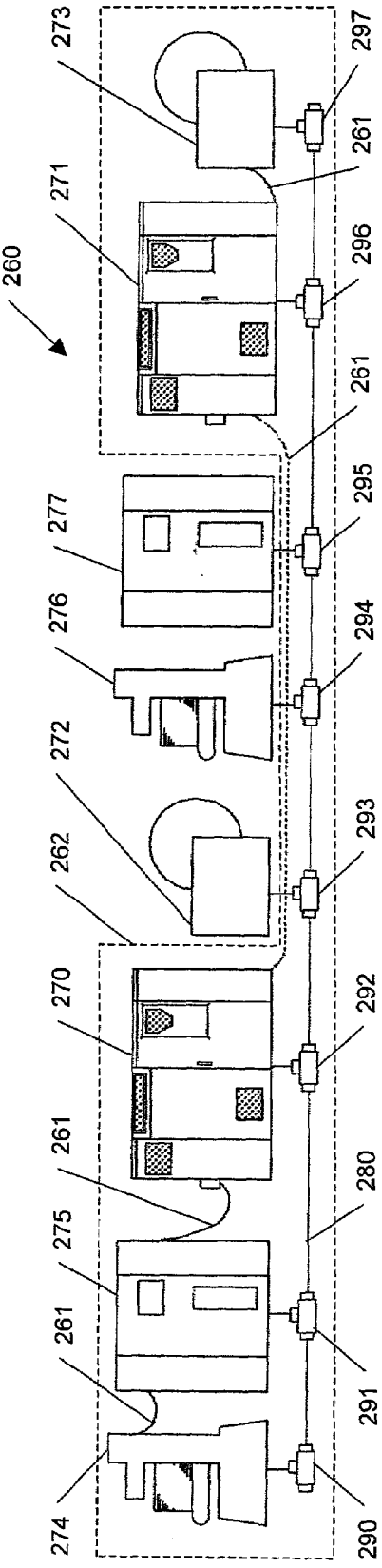

FIG. 2B shows a print line 260 comprising two paper masters 270, 271, two pre-processor paper slaves 272, 273 and four post-processor paper slaves 274–277, the paper masters and slaves being connected to a print line bus 280 by means of print line bus adapters 290–297 associated with each of the paper masters and slaves. The print line 260 has exemplarily been segmented into one segment 262 for duplex usage.

As can be seen from FIG. 2B, the two paper masters 270, 271 print on the same paper, i.e. the two paper masters are linked together within the same paper path 261, whereby the second printing device 270 takes the paper that comes from the first printing device 271 and prints on the other side thereof. By way of example, the illustrated paper masters 270, 271 represent CF printers, the illustrated pre-processor paper slaves 272, 273 represent un-winders, whereby un-winder 273 feeds paper into paper master 271 and the illustrated post-processor paper slaves 274, 275 and 276, 277 represent a cutter and a stacker, respectively.

As can be seen, the constituted segment 262 comprises two paper masters. The remaining devices 272, 276, 277 in print line 260 have not been allocated.

Print Line Segmentation Interface

Figure 3:
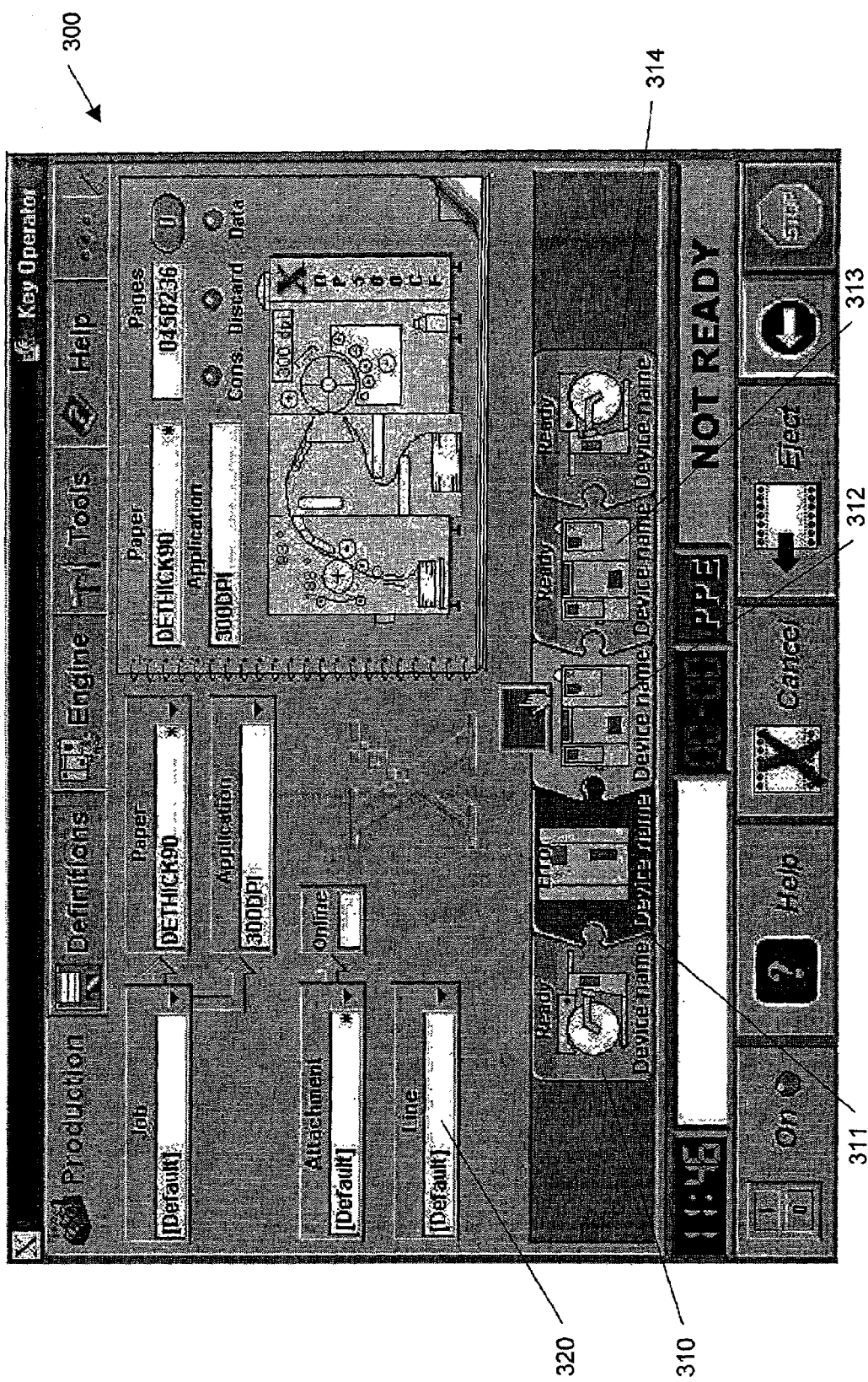
FIG. 3 illustrates a graphical user interface providing an exemplary print line management layer according to the invention.

FIG. 3 illustrates an exemplary graphical user interface (GUI) 300 for performing segmentation according to the invention. The GUI 300 comprises visual indicators 310–314 for each device in a print line 320. The visual indicators 310–314 are shown as icons that may be activated in order to display information relating to the corresponding devices.

If, for instance, the GUI 300 is displayed on a touch screen, each icon may be activated by pressure and touching a respective icon would enable to access e.g. a pop-up menu that allows for possible operations or state change declarations. Furthermore, the GUI 300 comprises status information relating to each device. The GUI 300 also allows a user to select a print line segment configuration.

Print Line Segmentation Process

Figure 4:
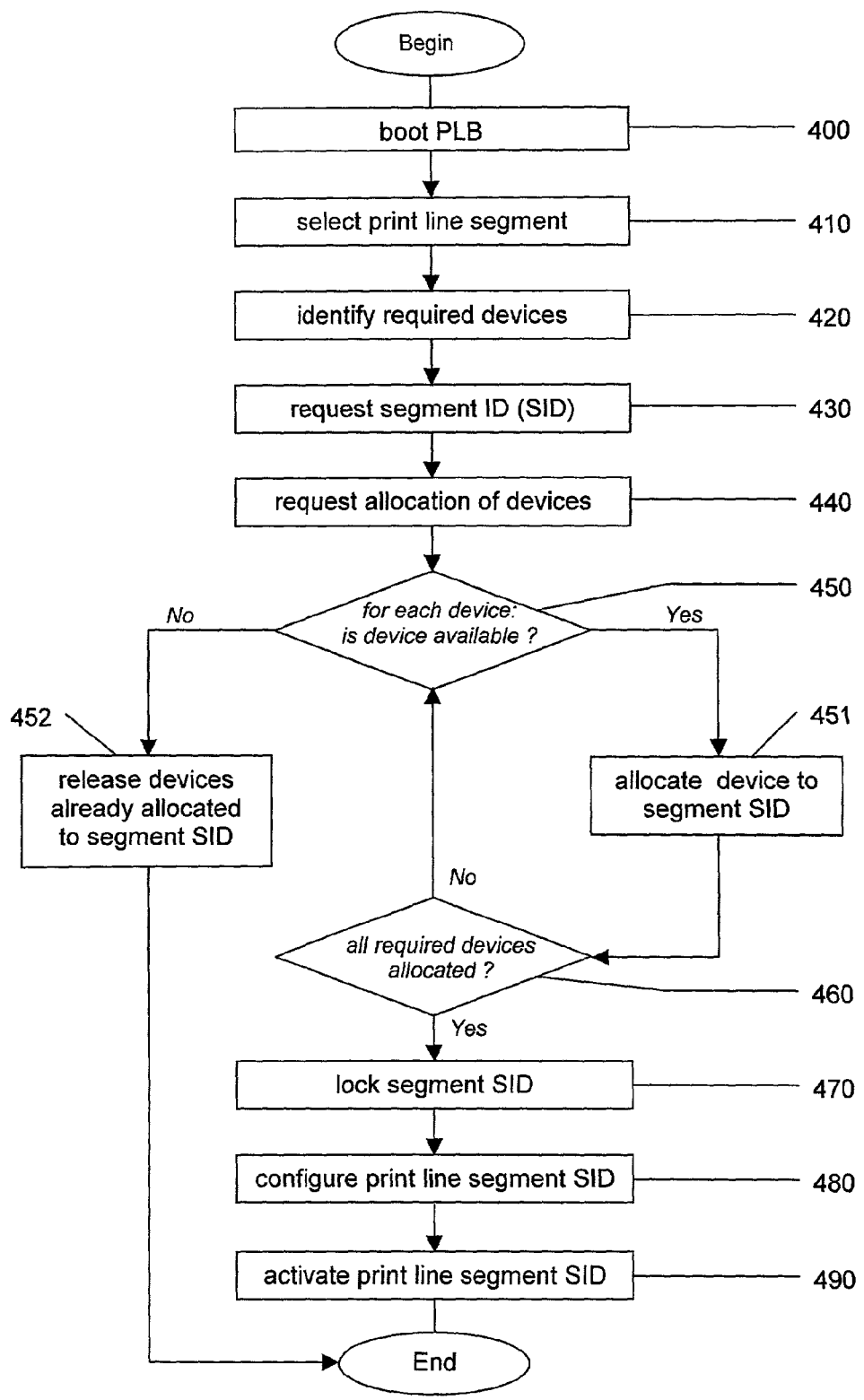
FIG. 4 is a general flowchart illustrating the segmentation technique of the invention.

FIG. 4 is a general flowchart illustrating the segmentation technique of the present invention.

In a print shop environment comprising a plurality of paper masters and slaves that are interconnected via a common print line bus, each paper master or slave being connected to the print line bus via an associated print line bus adapter and at least one of the paper masters comprising a print line management unit.

In step 400, the print line bus is booted. Booting the print line bus may either be achieved by switching on the electrical power source connected to the print line bus or by using a print line management unit associated with a paper master comprised in the print line. When the print line bus is booted, each print line bus adapter boots up and, if a print line management unit is in connection with a print line bus adapter, said print line bus adapter connects to said print line management unit.

The paper masters or slaves connected to the print line bus adapters that are successfully booted-up are attributed segment ID 0. This segment ID 0 indicates, that the corresponding device is not comprised in a print line segment and is therefore available to be segmented upon request.

If no print line management unit is associated with any of the paper masters and slaves comprised in the print line, the print line bus as a whole switches to stand-alone mode. The stand-alone mode of the print line bus is attempted a short time after the print line bus has booted without a print line management unit connection. In the stand-alone mode, the print line bus adapters having a paper master or slave attached thereto broadcast their respective available functions and store the available functions broadcasted by the other print line bus adapters. Preferably, if more than ten print line bus adapters are present in the print line, all adapters will switch to standby mode. After the broadcasting and storing of available functions is accomplished, the print line bus adapters attempt to sort their respective paper masters and slaves in a logical order depending on the class of paper masters or slaves available. Preferably if one, and only one, possible order solution is found using all detected paper masters and slaves, the print line bus performs a setup to a basic mode that allows for using basic functions of the print line bus representing a simple type-1 connectivity routing.

Usual signals in a type-1 connectivity routing are e.g. ready, error, soft stop, cycle up or paper pulse. "Ready" means that all paper masters and slaves must be ready for paper to advance, "error" means that a paper master or slave announces an error and is not ready, "soft stop" means that a paper master or slave requests momentary stop of the stop of the paper, "cycle up" represents a printer paper advance early warning and "paper pulse" represents usually ⅛" for synchronization purpose. Other signals as "I am going to advance" and so on may also be available.

As mentioned above, if one print line management unit connects to the print line bus set up in basic mode, a possible paper advance is stopped in an orderly manner and all paper masters and slaves switch to standby mode. In the standby mode, the paper masters and slaves are ready to be selected and allocated to what ever segment the print line management unit asks for.

In step 410, a required print line segment is selected. The selection of the print line segment is preferably accomplished via a graphical user interface providing a print line management unit layer.

According to an aspect of the present invention, a user may indicate a print job to be performed. According to this aspect, the print line management unit analyzes the selection of the user and determines the devices, i.e. paper masters and/or slaves in the print line, that are required to perform the print job indicated by the user.

According to another aspect, the user uses the graphical user interface to select a print line segment. According to this aspect, a plurality of different print line segments may be predetermined and a description of each segment may be provided comprising an indication of each device required for a respective segment.

In the following, the print line management unit attempts to establish the selected print line segment. As other print line management units may have connected to the print line bus, multiple print line management units may attempt to constitute different segments with the unallocated devices in standby mode, which are connected to the print line bus. In the following, for purposes of clarity, it is assumed that only one print line management unit attempts to establish a print line segment.

In step 420, the print line management unit identifies a combination of devices required to establish the selected print line segment. According to an aspect of the present invention, this step may be accomplished by determining serial numbers of devices connected to the print line bus. For instance, if it is determined that the selected print line segment requires one paper master representing a CF printer, one pre-processor paper slave representing an un-winder and two post-processor paper slaves, representing a post-printer and a stacker, comprised in the print line, the print line management unit identifies one CF printer, one un-winder, one post-printer and one stacker and identifies the corresponding serial numbers thereof.

In step 430, a segment ID is requested by the print line management unit. The print line bus adapter associated with the print line management unit determines a free segment ID, in the following referred to as SID, from the print line bus. This may be achieved by retrieving the segment IDs of operational segments via the print line bus and by determining as the SID a segment ID that is not already attributed to an operational segment.

In step 440, the print line management unit requests to allocate the identified required devices to the segment SID. A corresponding allocation request is established by the print line management unit and broadcasted over the print line bus adapter. The remaining print line bus adapters in the print line bus receive the broadcasted allocation request and, preferably, only the addressed print line bus adapters identified by their respective serial numbers reply to the request message. In order to reply, the adapters determine whether their associated device is already segmented or whether it is available to be segmented within segment SID. The reply message is transmitted to the requesting adapter comprising an indication on whether the respective replying device is available to be segmented or not.

In step 450, the print line management receives the reply messages and determines for each identified device whether it may be allocated to the segment SID. If a device is available and may be allocated, said device is allocated to segment SID in step 451. In step 460, the print line management determines whether all required devices are allocated or not. If all devices are not already allocated to segment SID, the print line management unit returns to step 450 and determines for a next required identified device whether it is available or not to be segmented. In the case that in step 450, it is determined that a required device is not available to be segmented to segment SID, all devices that have already been allocated to segment SID are released in step 452.

According to an aspect of the present invention, if all allocated devices are released in step 452, a report message is issued on the graphical user interface to indicate to the user that the print line segmentation failed. According to another aspect of the present invention, if all allocated devices are released in step 452, the print line management unit returns to step 420 and attempts to identify another possible combination of devices being capable of constituting the selected print line segment.

If it is determined in step 460 that all devices required for the selected print line segment are available and allocated to segment SID, the print line management unit locks segment SID in step 470.

In step 480 the print line segment SID is configured. This configuration comprises preferably configuring the print line bus adapters associated with the devices comprised in segment SID such, that these adapters filter out all messages that are not issued by a device from segment SID. This permits to enhance the processing speed of print line segment SID and enables to avoid interferences between different print line segments. The step of filtering out the messages is preferably performed at hardware level so that no software overhead is required to enable simultaneous functioning of several segments.

Furthermore, all print line management units of the devices allocated to segment SID establish a communication with each other and the segmented devices are sorted in the order of the paper path of print line segment SID.

Furthermore, the print line management unit asks for a print line bus setup so that each print line bus adapter selects a driver for the associated device that is adapted for synchronization of the multiple paper masters, if required, and for interfacing different types of devices with one another, as well as for complex print line handling sequences, such as paper loading or jam recovery.

Furthermore, the print line bus calculates which synchronization signals are to be considered and sets up the hardware message filters.

After configuring the print line segment SID in step 480, the print line segment SID switches to an active mode in step 490.

According to an aspect of the present invention, the user may request the print line management unit to release all devices allocated to a specific segment, if the segment is not operational. This enables the user to easily reconfigure the print line and to constitute print line segments as required. When the user requests such a release, the print line management unit releases preferably firstly all devices that are associated with a print line management unit and that are comprised within the segment, and terminates the network links with these print line management units. Then the print line management unit unlocks the segment at the print line bus level and the print line bus releases all devices allocated to this segment.

Segmentation Benefits

The above described segmentation technique is especially advantageous for the segmentation of a continuous feed print line as it enables using various devices in different segments. Paper masters and slaves can be combined in any number of separated print line segments, each of which contains at least one paper master and has its own paper path.

Furthermore, the segmentation technique according to the present invention provides for the simple reconfiguration of a print line, preferably piloted from the graphical user interface of the paper masters, and for using the print line bus as a distributed selection, filtering and synchronization device.

A further advantage of the present invention is that devices, and moreover, various combinations of paper slaves from multiple vendors can be arranged in any order.

In particular, the present invention permits fully distributed and integrated print line management without requiring any segmentation-specific piece of equipment. Furthermore, there is no difference between operating a multiplex print line and several simplex segments as sequences are the same as in conventional printing systems.

While the invention has been described with respect to embodiments constructed in accordance therewith, it will be apparent to those skilled in the art that various modifications, variations and improvements of the present invention may be made in the light of the above teachings and within the purview of the appended claims without departing from the spirit and intended scope of the invention.

In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A method of processing data in a data processing system comprising a plurality of electrical devices, wherein data is transmitted over a common data bus, the electrical devices being connected to the common data bus by associated adapters, the method comprising:
   identifying plural devices from the plurality of electrical devices required for performing a requested data processing, said identified devices constituting a segment of the plurality of electrical devices;
   assigning a segment identifier to the identified devices constituting said segment; and
   configuring adapters associated with the electrical devices that have been assigned said segment identifier in that each device of said segmented devices is able to filter out data that is destined to said respective device from the common data bus;
   wherein the common data bus comprises the adapters and the electrical devices are connected to the common bus by the adapters.

2. The method of claim 1, wherein the identified plural devices are comprised within a single standalone data processing device.

3. The method of claim 1, wherein at least one of the electrical devices constitutes a data processing management unit that controls said segmentation.

4. The method of claim 3, wherein the data processing management unit comprises a display unit and wherein identifying the plural devices comprises:
   providing a graphical user interface on the display unit, the graphical user interface representing a data processing management layer adapted to perform segmentation; and
   displaying a plurality of indications within the graphical user interface, each indication representing a user-selectable data processing;
   wherein the data processing management unit, in response to a user indicating the requested data processing, automatically identifies the necessary devices for the requested data processing.

5. The method of claim 4, wherein the data processing management unit assigns the segment identifier and configures the adapters.

6. The method of claim 3, wherein the data processing management unit comprises a display unit and wherein identifying the plural devices comprises:
   providing a graphical user interface on the display unit, the graphical user interface representing a data processing management layer adapted to perform segmentation; and
   displaying a user-selectable indicator for each device of the plurality of electrical devices within the graphical user interface;
   wherein, in response to a user selecting an indicator, the device corresponding to the selected indicator is identified.

7. The method of claim 6, wherein the data processing management unit assigns the segment identifier and configures the adapters.

8. The method of claim 1, wherein the segment identifier is a unique identifier.

9. The method of claim 1, wherein the data processing system automatically identifies the plural devices required in response to a user indicating the requested data processing.

10. The method of claim 1, wherein identifying plural devices from the plurality of electrical devices comprises determining unique identifiers attributed to the adapters of the identified devices; and
    wherein assigning the segment identifier comprises:
       broadcasting an allocation request over the common data bus, the allocation request comprising at least the segment identifier and the determined unique identifiers,
       receiving the allocation request in the adapters having an identifier corresponding to one of said determined unique identifiers and determining whether the identified devices are segmented or not, and
       for each un-segmented identified device, indicating that said device may be assigned the segment identifier.

11. The method of claim 10, wherein assigning the segment identifier further comprises:
    if one of the identified devices is already segmented, indicating that the identified devices may not be assigned the segment identifier;
    releasing the identified devices; and
    repeating the identifying of plural devices from the plurality of electrical devices required for performing the requested data processing.

12. The method of claim 10, wherein the determined unique identifiers represent serial numbers attributed to the adapters of the identified devices.

13. A method of processing data in a printing system comprising a first plurality of printing devices and a second plurality of print-related devices, wherein data is transmitted over a common print line bus, the printing devices and print-related devices being connected to the common print line bus by associated print line bus adapters to constitute a printshop environment, the method comprising:
    identifying plural devices from the first plurality of printing devices and the second plurality of print-related devices required for performing a requested print processing, said identified devices constituting a print line segment of the first and second plurality of devices;
    assigning a segment identifier to the identified devices constituting said print line segment; and
    configuring print line bus adapters associated with the devices that have been assigned said segment identifier in that each device of said segmented devices is able to filter out data that is destined to said respective device from the common print line bus; wherein the common print line bus comprises the print line bus adapters and the printing devices and print-related devices are connected to the common print line bus by the print line bus adapters.

14. The method of claim 13, wherein the first plurality of printing devices comprises a standalone printing device and/or a continuous feed printer.

15. The method of claim 13, wherein the second plurality of print-related devices comprises a roll unwinder, a rewinder, a burster, a trimmer, a stacker, a cutter, an inserter and/or a label sticker.

16. The method of claim 13, wherein at least one of the devices of said first plurality of printing devices constitutes a print line management unit that controls said segmentation.

17. The method of claim 16, wherein the print line management unit comprises a display unit and wherein identifying the plural devices comprises:
providing a graphical user interface on the display unit, the graphical user interface representing a print line management layer adapted to perform segmentation; and
displaying a plurality of indications within the graphical user interface, each indication representing a user-selectable print processing;
wherein the print line management unit, in response to a user indicating the requested print processing, automatically identifies the necessary devices for the requested print processing.

18. The method of claim 17, wherein the print line management unit assigns the segment identifier and configures the adapters.

19. The method of claim 16, wherein the print line management unit comprises a display unit and identifying the plural devices comprises:
providing a graphical user interface on the display unit, the graphical user interface representing a print line management layer adapted to perform segmentation; and
displaying a user-selectable indicator for each device of the first and second plurality of devices within the graphical user interface;
wherein identifying plural devices comprises, in response to a user selecting an indicator, identifying the device corresponding to the selected indicator.

20. The method of claim 19, wherein the print line management unit assigns the segment identifier and configures the adapters.

21. The method of claim 13, wherein the segment identifier is a unique identifier.

22. The method of claim 13, wherein the printing system automatically identifies the plural devices required in response to a user indicating the requested print processing.

23. The method of claim 13, wherein identifying plural devices from the first and second plurality of devices comprises determining unique identifiers attributed to the print line bus adapters of the identified devices; and
wherein assigning the segment identifier comprises:
broadcasting an allocation request over the common print line bus, the allocation request comprising at least the segment identifier and the determined unique identifiers,
receiving the allocation request in the print line bus adapters, having an identifier corresponding to one of said determined unique identifiers and determining whether the identified devices are segmented or not, and
for each un-segmented identified device, indicating that said device may be assigned the segment identifier.

24. The method of claim 23, wherein assigning the segment identifier further comprises:
if one of the identified devices is already segmented, indicating that the identified devices may not be assigned the segment identifier;
releasing the identified devices; and
repeating the identifying of plural devices from the first and second plurality of devices required for performing the requested print processing.

25. The method of claim 23, wherein the determined unique identifiers represent serial numbers attributed to the adapters of the identified devices.

26. A print line comprising a first plurality of printing devices and a second plurality of print-related devices, wherein data is transmitted over a common print line bus, the printing devices and print-related devices being connected to the common print line bus by associated print line bus adapters to constitute a printshop environment, and a print line management unit for establishing segments of the print line, the print line management unit comprising:
identifying means for identifying plural devices from the first plurality of printing devices and the second plurality of print-related devices required for performing a requested print processing, said identified devices constituting a print line segment of the first and second plurality of devices;
assigning means for assigning a segment identifier to the identified devices constituting said print line segment; and
configuring means for configuring print line bus adapters associated with the devices that have been assigned said segment identifier in that each device of said segmented devices is able to filter out data that is destined to said respective device from the common print line bus; wherein the common print line bus comprises the print line bus adapters and the printing devices and print-related devices are connected to the common print line bus by the print line bus adapters.

27. The print line of claim 26, wherein the first plurality of printing devices comprises a standalone printing device and/or a continuous feed printer.

28. The print line of claim 26, wherein the second plurality of print-related devices comprises a roll unwinder, a rewinder, a burster, a trimmer, a stacker, a cutter, an inserter and/or a label sticker.

29. The print line of claim 26, wherein the print line management unit further comprises a display unit for providing a graphical user interface, said graphical user interface comprising a plurality of indications within the graphical user interface, each indication representing a user-selectable print processing.

30. The print line of claim 29, wherein the display unit comprises a touchscreen.

31. The print line of claim 26, wherein the print line management unit further comprises a display unit for providing a graphical user interface, said graphical user interface comprising a user-selectable indicator for each device of said first and second plurality of devices.

32. The print line of claim 31, wherein the display unit comprises a touchscreen.

33. A method, comprising:
identifying plural devices from a plurality of electrical devices required for performing a requested data processing, said identified devices constituting a segment of the plurality of electrical devices;
assigning a segment identifier to the identified devices constituting said segment; and
configuring adapters associated with the electrical devices that have been assigned said segment identifier in that each device of said segmented devices is able to filter out data that is destined to said respective device from a common data bus; wherein the common data bus comprises the adapters and the adapters connect the electrical devices to the common data bus.

* * * * *